(12) United States Patent
Miyazawa et al.

(10) Patent No.: US 7,085,051 B2
(45) Date of Patent: *Aug. 1, 2006

(54) POLARIZER AND OPTICAL DEVICE USING THE POLARIZER

(75) Inventors: Atsushi Miyazawa, Suwa (JP); Toshiaki Hashizume, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 10/918,462

(22) Filed: Aug. 16, 2004

(65) Prior Publication Data

US 2005/0012996 A1 Jan. 20, 2005

Related U.S. Application Data

(63) Continuation of application No. 10/105,452, filed on Mar. 26, 2002, now Pat. No. 6,833,953.

(30) Foreign Application Priority Data

Mar. 29, 2001 (JP) ............................. 2001-095256
Nov. 14, 2001 (JP) ............................. 2001-348910
Mar. 19, 2002 (JP) ............................. 2002-076021

(51) Int. Cl.
*G02B 5/30* (2006.01)
(52) U.S. Cl. ..................... 359/486; 359/569; 353/20
(58) Field of Classification Search ............... 359/486, 359/352, 483, 485; 353/20
See application file for complete search history.

(56) References Cited

U.S. PATENT DOCUMENTS

| 4,289,381 | A | 9/1981 | Garvin et al. |
| 4,436,363 | A | 3/1984 | Steinbruegge et al. |
| 4,712,881 | A | 12/1987 | Shurtz, II et al. |
| 5,038,041 | A | 8/1991 | Egan |
| 5,969,861 | A | 10/1999 | Ueda et al. |
| 6,122,103 | A | 9/2000 | Perkins et al. |
| 6,208,463 | B1 | 3/2001 | Hansen et al. |
| 6,234,634 | B1 | 5/2001 | Hansen et al. |
| 6,243,199 | B1 | 6/2001 | Hansen et al. |
| 6,288,840 | B1 | 9/2001 | Perkins et al. |
| 6,486,997 | B1 | 11/2002 | Bruzzone et al. |
| 6,542,307 | B1 | 4/2003 | Gleckman et al. |
| 6,585,378 | B1 * | 7/2003 | Kurtz et al. ................ 353/31 |

(Continued)

FOREIGN PATENT DOCUMENTS

JP 5-165012 6/1993

(Continued)

OTHER PUBLICATIONS

L.B. Whitbourn, et al., "Phase shifts in transmission line models of thin periodic metal grids", Applied Optics, vol. 28, No. 15, pp. 3511-3515, Aug. 15, 1989.*

*Primary Examiner*—Arnel C. Lavarias
(74) *Attorney, Agent, or Firm*—Oliff & Beridge, PLC

(57) ABSTRACT

A polarizer for converting incident light beam into a linear polarization light beam has a base plate of a material of low linear expansion coefficient, high thermal conductivity or low photoelastic constant, a birefringent portion formed by arranging minute metal concave thread on a surface of light-emission side of the base plate in stripe, and a protection plate covering the birefringent portion and made of the same material as the base plate, the base plate and the protection plate being bonded by an elastic adhesive on the periphery thereof so that the birefringent portion is sealed and enclosed by the protection plate and the elastic adhesive.

90 Claims, 5 Drawing Sheets

U.S. PATENT DOCUMENTS

| | | |
|---|---|---|
| 6,833,953 B1 * | 12/2004 | Miyazawa et al. .......... 359/486 |
| 2001/0053023 A1 | 12/2001 | Kameno et al. |
| 2002/0101664 A1 | 8/2002 | King et al. |
| 2002/0167727 A1 | 11/2002 | Hansen et al. |
| 2003/0072079 A1 | 4/2003 | Silverstein et al. |
| 2003/0117708 A1 | 6/2003 | Kane |

FOREIGN PATENT DOCUMENTS

| | | |
|---|---|---|
| JP | 5-307112 | 11/1993 |
| JP | 10-301105 | 11/1998 |
| JP | 11-337730 | 12/1999 |
| JP | 2000-249833 | 9/2000 |

* cited by examiner

POLARIZER AND OPTICAL DEVICE USING THE POLARIZER

This is a Continuation of application Ser. No. 10/105,452, filed Mar. 26, 2002 now U.S. Pat. No. 6,833,953. The entire disclosure of the prior application is hereby incorporated by reference in its entirety.

BACKGROUND OF THE INVENTION

1. Field of the Invention

The present invention relates to a polarizer for converting incident light beam into a linear polarization beam and an optical device using the polarizer.

2. Description of Related Art

Conventionally, a projector having a light source, an electric optical device for modulating the light beam irradiated by the light source in accordance with image information, and a projection optical system for enlarging and projecting the light beam modulated by the electric optical device has been used as an optical device using the electric optical device.

Liquid crystal device is known as the electric optical device, which includes an electric optical element having a pair of transparent substrates between which electric optical material such as liquid crystal is sealed and enclosed, and two polarization plates as a polarizer disposed on the light-incident side and light-emission side of the electric optical device.

In a conventional arrangement, the polarizer is made of organic material such as PVA (polyvinyl alcohol) including iodine and colorant, which is made by sandwiching a film oriented in a predetermined direction with a support body such as glass plate or by adhering the film to the support body.

However, since such conventional polarizer is made of organic material, the polarizer is weak against high temperature and is decolorized after continuous use in an environment of more than 70° C. to lose polarizing function.

Accordingly, a structural birefringent polarizer has been proposed as a polarizer made of inorganic material. The structural birefringent polarizer is constructed by forming a birefringent portion where a plurality of stripe-shaped minute linear convex treads of metal such as aluminum are arranged on a surface of a transparent substrate such as glass, which uses diffraction of the space between the convex treads to convert the incident light beam to the linear polarization beam.

However, since such structural birefringent polarizer absorbs a part of the incident light beam on the birefringent portion, the glass substrate is distorted on account of heat, thus failing to conduct appropriate polarization conversion. Especially, when the glass substrate is disposed on the light emission-side, the polarization axis of the polarized light beam converted by the birefringent portion is revolved in the glass substrate, thereby causing light transmission failure where a part of the light does not pass through the glass substrate.

SUMMARY OF THE INVENTION

According to an aspect of the present invention, a specific base material of structural birefringent polarizer is selected in order to provide a polarizer having great durability and capable of conducting appropriate polarization conversion and an optical device using the polarizer.

Specifically, a polarizer according to an aspect of the present invention is for converting incident light beam into a linear polarization light beam, which includes: a base plate of a material having light transmittance of more than 97%; and a birefringent portion formed by arranging minute metal concave treads in stripe on a light-emission surface of the base plate.

The example of the base material having light transmittance of more than 97% is sapphire, LBC3N (manufactured by HOYA OPTICS CORPORATION), and Neoceram (manufactured by Nippon Electric Glass Co., Ltd).

The base plate may preferably be made of material having linear expansivity of less than $4.8*10^{-7}$/K. Example of such material is silica glass, Neoceram, CLEARCERAM (manufactured by Ohara Inc.), in which crystallized glass and silica glass may more preferably be used.

Concave treads made of aluminum may be used as the metal concave tread constituting the birefringent portion, where polarization properties of the polarizer is determined in accordance with the pitch, height and duty ratio of the concave tread. For instance, a plurality of concave treads of 65 nm width and 120 to 170 nm height may be arranged in 144 nm pitch to constitute the birefringent portion.

According to the present aspect, since the base plate is located on light-incident side, the revolution of polarization axis of the light beam after polarization conversion caused on account of influence of thermal distortion of the base plate can be prevented, thereby conducting appropriate polarization conversion. Since the material of low linear expansivity is used for the base material, distortion is not likely to be generated even when the heat absorbed by the birefringent portion affects on the base material, light transmission failure of the polarizer can be prevented. Further, since the birefringent portion is made of metal, sufficient durability can be secured.

The base plate may preferably be made of a material having thermal conductivity of more than 6.21 W/(m·K).

In the above arrangement, specific base material may be sapphire or crystal.

According to the above arrangement, since the material of high thermal conductivity is used as the base material, even when the heat absorbed by the birefringent portion affects on the base material, the heat can be immediately radiated through the holding frame etc. of the polarizer, so that thermal distortion is not likely to generated on the base plate, thereby preventing light transmission failure of the polarizer.

The base plate may preferably be made of a material having photoelasticity constant of less than $0.43*10^{-12}$/Pa.

The photoelasticity constant is a proportional constant representing relationship between a stress applied to the base plate and an optical-path difference caused by birefringence of the light transmitting through the base plate while the stress being applied. Specifically, when the optical-path difference by birefringence is represented as δ (mm), a component of internal stress of the base plate orthogonal with advancement direction of light is represented as Ps ($*10^5$ Pa), and thickness of the base plate is represented as d (mm), following relationship as shown in the following formula (1) is established.

$$\delta = B \cdot Ps \cdot d/10 \quad (1)$$

The proportional constant B of the formula (1) is the photoelasticity constant, which is normally represented according to unit of $10^{-12}$/Pa.

The base material having the above specific photoelasticity constant is, for instance, low photoelasticity glass LBC3N manufactured by HOYA OPTICS CORPORATION.

According to the present arrangement, since the base material is made of a material of low photoelasticity constant, as evident by the formula (1), even when the internal stress Ps is generated on account of thermal distortion caused when the heat absorbed by the birefringent portion is applied on the base plate, the optical-path difference δ can be restrained to a small value on account of small photoelasticity constant B, so that light transmission failure etc. can be prevented.

In the above arrangement, antireflection treatment may preferably be conducted on a light-incident surface of the base plate.

Since the antireflection treatment is conducted, utilization ratio of incident light beam can be improved by reducing the reflected light, so that the loss of light transmitting through the polarizer can be reduced.

In the above polarizer, a protection plate covering the birefringent portion may preferably be provided. The material of the protection plate may preferably be the same as the base plate having the above-described birefringent portion. Specifically, crystallized glass, silica glass, sapphire, crystal etc. may be used.

As described above, since the birefringent portion is constructed by arranging metal concave treads such as aluminum in stripe, the concave treads can be deteriorated under high temperature and high humidity. Provision of the protection plate prevents deterioration of the concave treads, so that durability of the polarizer can be further enhanced and the polarizer is not deteriorated even when the optical device including the polarizer is exposed to high temperature and high humidity during transportation and use.

The protection plate may preferably have the same linear expansivity, thermal conductivity and photoelasticity constant as the above base plate. The preferable thickness range of the protection plate is determined in accordance with the relationship between the linear expansivity, thermal conductivity and photoelasticity constant.

Specifically, the protection plate may preferably represented as in the following formula, where the thickness of the plate is d (mm), photoelasticity constant is B ($10^{-12}$/Pa), Young's modulus is E (Pa), linear expansivity is α (1/K), and thermal conductivity is ρ (W/(m·K)).

$$B*E*\alpha/\rho*d \leq 9.8*10^{-5} \ (m^2W) \qquad (2)$$

Further, the antireflection treatment may preferably be conducted on the light-incident and light-emission sides of the protection plate.

Since the antireflection treatment is conducted on both of the light-incident and light emission sides of the protection plate, the light utilization ratio can be improved as in the above, and unnecessary reflection light on the transmission surface can be prevented, so that S/N ratio of signal can be improved.

The protection plate may preferably be bonded to the base plate by an elastic adhesive at the outer periphery thereof, and the birefringent portion may preferably be sealed by the protection plate and the elastic adhesive.

The elastic adhesive is used to absorb the difference between the movements of the both of the plates and for sealing and enclosing the birefringent portion. The material of the elastic adhesive may preferably be silicone type and more preferably be of unreacted-oil component restrained type.

When the substrate surfaces of the protection plate and the base plate are entirely bonded by the elastic adhesive, the space between the concave treads of the birefringent portion is buried by the elastic adhesive, so that light diffraction ability of the birefringent portion is deteriorated, thus lowering polarization conversion efficiency. By thus bonding the protection plate and the base plate with the elastic adhesive at the outer periphery thereof, the space between the concave treads can be prevented from being buried by the adhesive, so that appropriate polarization conversion can be achieved within the space and optically excellent polarizer can be obtained. Further, with the use of silicone adhesive of unreacted-oil component restrained type, invasion of solvent into the space between the concave treads after adhesion can be prevented, thereby optically improving the quality of the polarizer.

The above-described protection plate may be formed in an approximately the same shape as the base plate, or alternatively, be formed in a shape greater than the base plate.

Since the shape of the protection plate is approximately the same as the base plate, the size of the polarizer can be minimized within a range required for polarization conversion, thereby reducing the size of the polarizer. Incidentally, the elastic adhesive may be coated on peripheral end of the protection plate and the base plate to bond both of the plates.

On the other hand, by arranging the protection plate greater than the base plate, the periphery of the base plate and the surface of the protection plate can be bonded by the elastic adhesive, adhesion area can be increased and sealing property of the inside space can be enhanced.

A spacer may preferably be interposed between the base plate and the protection plate. The spacer may preferably be made of light-curing adhesive or a double-sided tape having elastic sticky surface on front and back sides thereof.

When the light-curing adhesive is used as the spacer, the light-curing adhesive is coated between the base plate and the protection plate in a dotted manner and the base plate and the protection plate are superposed. After moving the protection plate to a designed spaced position, the adhesive is cured by irradiating ultraviolet etc.

When the double-sided tape is used as the spacer, acrylic resin or silicone may preferably be used on an elastic sticky surface thereof. The double-sided tape may preferably be attached on the entire circumference of the birefringent portion.

By interposing the spacer, the protection plate can be disposed at the most appropriate position in conducting polarization conversion by the birefringent portion, so that optically excellent polarizer can be obtained.

Further, when the double-sided tape is used as the spacer, since the spacer can be disposed only by sticking the double-sided tape, workability can be enhanced. By sticking the double-sided tape on the entire circumference of the birefringent portion, even when the unreacted-oil component is spread from the silicone adhesive bonding the protection plate and the base plate, the oil component is dammed by the double-sided tape, so that contamination of the birefringent portion by the unreacted-oil component can be prevented.

The sticky surface of the spacer may preferably be formed by silicone sticky agent.

Since silicone has excellent ultraviolet resistance on the adhesion surface, the sticky surface of the spacer is less likely to be deteriorated by the ultraviolet. Further, since silicone also has excellent heat resistance, the sticky surface of the spacer is less likely to be deformed under influence of the heat absorbed by the birefringent portion.

The spacer may preferably have a support body made of woven fabric or unwoven fabric, the front and back sides of the support body being provided with a sticky surface coated with the silicone sticky agent. Alternatively, the spacer may preferably be composed of the silicone sticky agent.

When the support body is provided, the strength of the double-sided tape can be secured by the support body, so that workability in sticking the double-sided tape can be enhanced.

On the other hand, when the spacer is composed solely of the silicone sticky agent, since the difference of the movement of the protection plate and the base plate caused by heat can be absorbed thereby, appropriate distance can be retained between the birefringent portion formed on the base plate and the protection plate. Further, since the spacer is composed solely of the silicone sticky agent, the thickness of the spacer can be reduced, thus reducing the thickness of the polarizer.

The present invention is not embodied solely as the above-described polarizer, but also can be embodied as an optical device having the polarizer. Specifically, an optical device according to another aspect of the present invention includes an electric optical device for modulating a light beam irradiated by a light source, the electric optical device having an electric optical element sandwiching an electric optical material between a pair of plates and a polarizer disposed on a light-incident side and/or a light-emission side of the electric optical device, the polarizer having a base plate made of a material having light transmittance of more than 97% and a birefringent portion formed by arranging minute metal concave treads on the surface of the light-emission side of the base plate in stripe.

According to the above optical device, since the polarizer having high durability and capable of conducting appropriate polarization conversion is provided, the durability and optical characteristics of the optical device can be improved.

DETAILED DESCRIPTION OF PREFERRED EMBODIMENT(S)

Preferred embodiments of the present invention will be described below with reference to attached drawings.

First Embodiment

Figure 1:
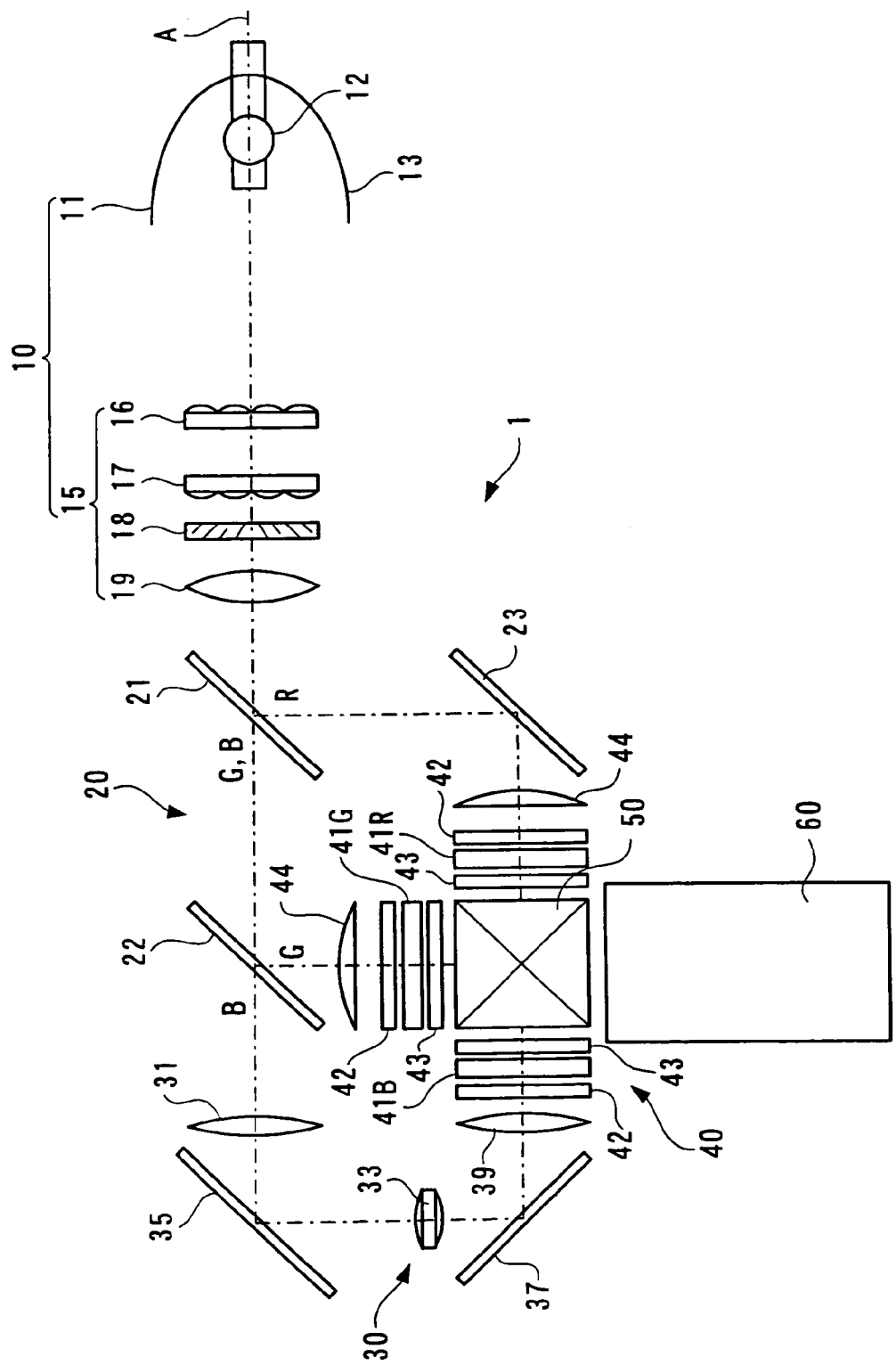
FIG. 1 is a schematic illustration showing an arrangement of projector according to first embodiment of the present invention.

FIG. 1 is a schematic view showing a structure of an optical system of a projector 1 as the optical device according to the present invention. The projector 1 has an integrator illuminating optical system 10, a color separating optical system 20, a relay optical system 30, an electric optical device 40, a cross dichroic prism 50 as a color combining optical system and a projection lens 60 as a projection optical system.

The integrator illuminating optical system 10 has a light source 11 and a uniform illuminating optical system 15. The light source 11 is composed of a light source lamp 12 such as metal halide lamp and high-pressure mercury lamp, and a parabolic reflector 13 for aligning and parallelizing the direction of the light beam emitted from the light source lamp 12.

The uniform illuminating optical system 15 separates the light beam emitted by the light source 11 into a plurality of sub-beams and aligns the polarization direction of the sub-beams to P polarization light beam or S polarization light beam, which includes a first lens array 16, a second lens array 17, a PBS array 18 and a condenser lens 19.

The first lens array 16 functions as a beam splitter for separating the light beam emitted from the light source lamp 12 into a plurality of sub-beams and includes a plurality of lenses arranged in matrix on a plane orthogonal with illumination optical axis A. The aspect ratio of the respective lenses corresponds to the aspect ratio of the image formation area of liquid crystal panels 41R, 41G and 41B constituting the below-described electric optical device 40.

The second lens array 17 is an optical element for concentrating the sub-beams separated by the above-described first lens array 16 and includes a plurality of lenses arranged in matrix on a plane orthogonal with illumination optical axis A as in the first lens array 16. Though the arrangement of the respective lens corresponds to the lenses constituting the first lens array 16, the size of the respective lenses is not required to correspond to the aspect ratio of the image formation area of the liquid crystal panels 41R, 41G and 41B as in the first lens array 16.

The PBS array 18 as a polarization converter is an optical element for aligning the polarization direction of the respective sub-beams separated by the first lens array 16 in one direction, which includes a polarization separating film which separates the incident light beam into P polarization light beam and S polarization light beam by transmitting one of the P polarization light beam and the S polarization light beam and reflecting the other, a reflection mirror for bending the advancement direction of the polarization light beam reflected by the polarization separating film to align with the transmitted polarization light beam, and a retardation plate disposed on the emission side of either one of the polarization light beams separated by the polarization separating film to conduct polarization conversion of the polarization light beam.

The condenser lens 19 condenses the plurality of sub-beams passing through the first lens array 16, the second lens array 17 and the PBS array 18 to be superposed on the image formation area of the liquid crystal panels 41R, 41G and 41B.

The color-separating optical system 20 has two dichroic mirrors 21 and 22 and a reflection mirror 23, the mirrors 21, 22 and 23 separating the plurality of sub-beams emitted from the integrator illuminating optical system 10 into three color lights of red, green and blue. Specifically, the dichroic mirror 21 separates the red color light R from the other color lights G and B, and the dichroic mirror 22 separates the green color light G from the blue color light B.

The relay optical system 30 has an incident-side lens 31, a relay lens 33, reflection mirrors 35 and 37, and an emission-side lens 39, which introduces the color light separated by the color separating optical system 20, e.g. the blue color light B in the present embodiment, into the liquid crystal panel 41B.

The electric optical device 40 has the liquid crystal panels 41R, 41G and 41B, polarization plates 42 and 43, and a field lens 44 disposed on the incident-side of the polarization plate 42.

The liquid crystal panels 41R, 41G and 41B encloses and seals liquid crystal as an electric optical material between a pair of transparent glass substrates, which uses, for instance, polysilicon TFT as a switching element to modulate the polarization direction of the polarized light emitted from the polarization plate 42.

The polarization plate 42 is an optical element for converting the incident light beam into a linear polarization light beam which transmits, for instance, only the S polarization light beam of the incident light beam in the present embodiment.

The polarization plate 43 only transmits P polarization of the light beam modulated by the liquid crystal panels 41R, 41G and 41B. Incidentally, details of the structures of the polarization plates 42 and 43 will be described below.

The field lens 44 is an optical element for parallelizing the emitted light beam condensed by the condenser lens 19 of the integrator illuminating optical system 10 relative to the illumination optical axis which is disposed on an upstream of the liquid crystal panels 41R and 41G. For the liquid crystal panel 41B, the emission-side lens 39 of the relay optical system 30 works as the field lens.

The cross dichroic prism 50 as the color combining optical system combines the image modulated for respective color lights emitted from the three liquid crystal panels 41R, 41G and 41B to form a color image. A dielectric multilayer film for reflecting the red color light and a dielectric multilayer film for reflecting the blue color light are formed in an approximate X-shape along the boundary of the four right-angle prisms, the dielectric multilayer films combining the three color lights.

The projection lens 60 includes a lens unit composed of a plurality of lens set, which enlarges and projects the color image combined by the cross dichroic prism 50 on a screen.

Figure 2:
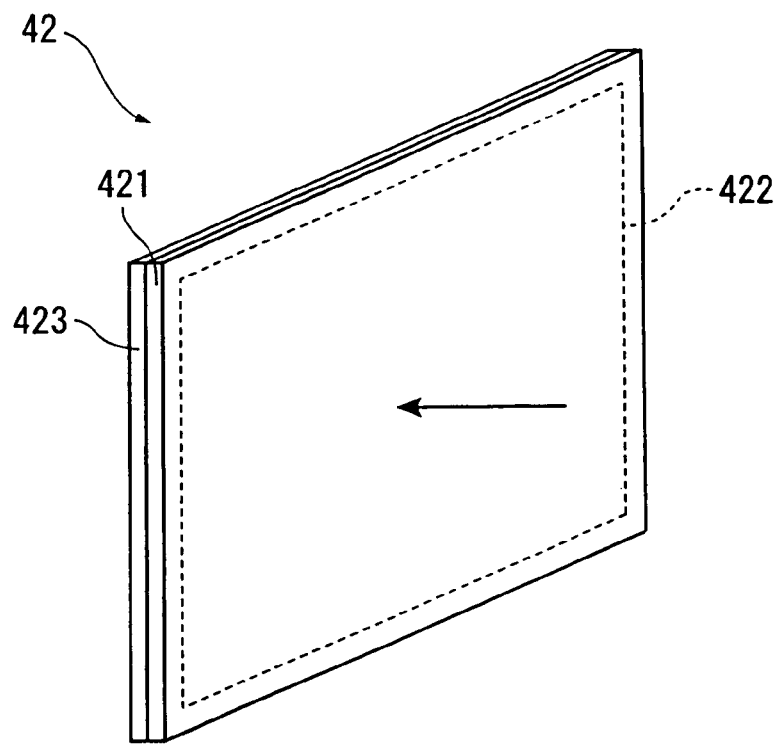
FIG. 2 is a brief perspective view showing a structure of polarizer according to the first embodiment.
Figure 3:
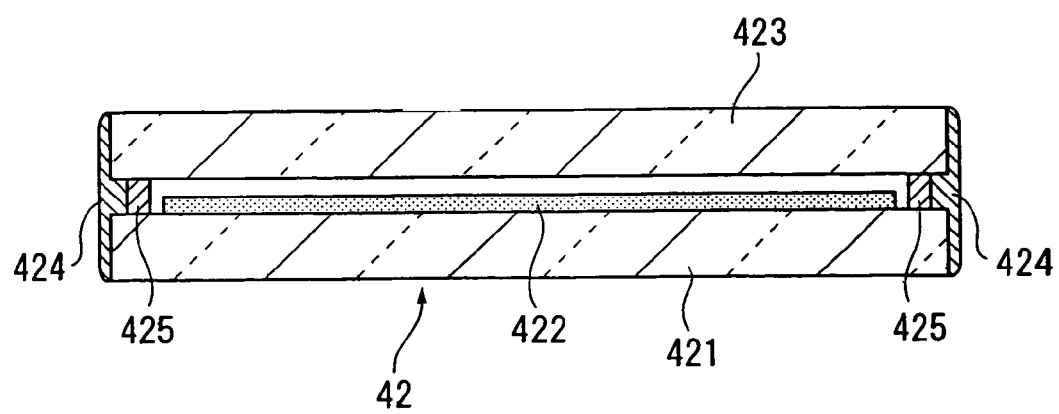
FIG. 3 is a cross section showing a structure of the polarizer according to the first embodiment.

In thus arranged projector 1, the polarization plate 42 disposed on the incident side of the liquid crystal panels 41R, 41G and 41B has a base plate 421, a birefringent portion 422 formed on the base plate 421 and a protection plate 423 covering the birefringent portion 422 as shown in FIGS. 2 and 3.

The base plate 421 is made of silica glass of $4.8*10^{-7}$/K linear expansivity and of 1.35 W/(m·K) thermal conductivity. The birefringent portion 422 is formed on the light-emission side of the base plate 421 and an antireflection film (not shown) is formed on the light-incident side thereof.

With the use of the silica glass as the material of the base plate 421, internal light absorption can be restrained below 0.1% and boundary reflection can be restrained below 0.5% by the antireflection film, so that the light transmittance of the base plate 421 is more than 98.9% (100%−0.1%−0.5%*2).

Figure 4:
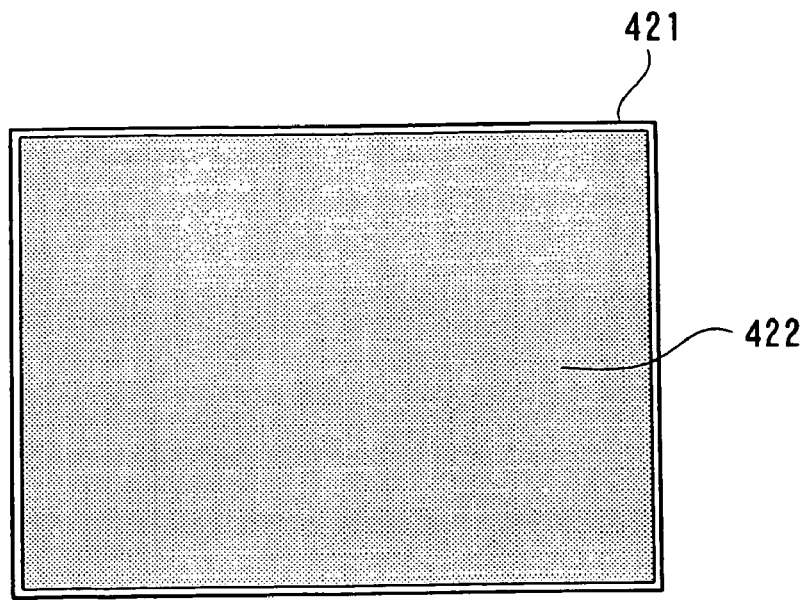
FIG. 4 is a front elevational view showing a birefringent portion of the polarizer according to the first embodiment.
Figure 5:
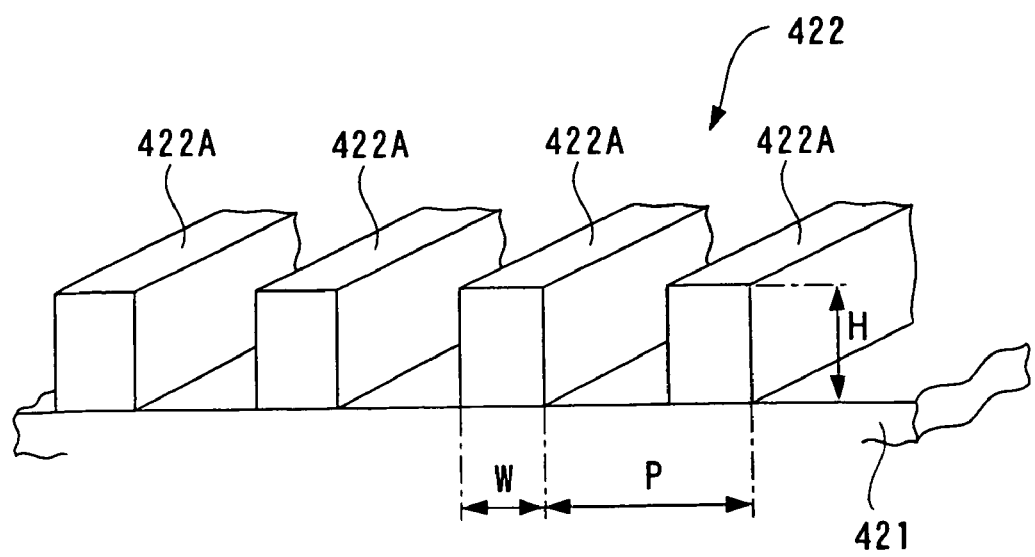
FIG. 5 is a partial perspective view showing a structure of the birefringent portion of the polarizer according to the first embodiment.

The birefringent portion 422 formed on the light-emission side of the base plate 421 is formed on the approximately entire surface of the base plate 421 as shown in FIGS. 4 and 5, which is made by arranging a plurality of minute aluminum ribs 422A to be a convex tread in a stripe-shape, where the polarization is converted in a space sandwiched by the ribs 422A. The width W of the rib 422A constituting the birefringent portion 422 is approximately 65 nm, height H is 120~170 nm and line pitch P is approximately 144 nm, the W, H and P being adjusted to change the polarization properties of the polarization plate 42.

The protection plate 423 has a shape approximately the same as the base plate 421, which is bonded to the base plate 421 at the periphery thereof through a silicone adhesive 424 as shown in FIG. 3, and the birefringent portion 422 formed on the base plate 421 is enclosed and sealed by the silicone adhesive 424 and the protection plate 423.

In order to locate the base plate 421 on the light-incident side, the protection plate 423 is disposed on light-emission side. Incidentally, though not shown, antireflection film is formed on the light-incident side and the light-emission side of the protection plate 423.

The relationship between the thickness d (mm) of the protection plate for the polarized light beam being transmitted, the photoelasticity constant B ($10^{-12}$/Pa), Young's modulus E (Pa), linear expansivity α (1/K), thermal conductivity ρ (W/(m·K)) of the material used for the protection plate can be represented by the formula (2).

For instance, when silica glass is used for the material of the protection plate, the silica glass's photoelasticity constant B=$3.61*10^{-12}$/Pa, Young's modulus E=$7.3*10^{10}$ Pa, linear expansivity α=$4.8*10^{-7}$/K, and thermal conductivity ρ=1.35 W/(m·K), so that the thickness d is less than or the same as 1 mm according to the formula (2), thereby allowing less than about 1 mm thickness of the protection plate.

The silicone adhesive 424 is un-reacted oil component restrained type, which absorbs deformation generated by the different movements of the base plate 421 and the protection plate 423 on account of heat etc.

A spacer 425 is interposed between the base plate 421 and the protection plate 423, so that the protection plate 423 is spaced apart from the birefringent portion 422 with a predetermined distance. The spacer 425 is formed by solidifying ultraviolet curing adhesive.

Next, producing method of the polarization plate 42 will be described below.

Initially, ultraviolet curing adhesive is coated on a periphery of the protection plate 423 in a dotted manner and the coated surface is opposed to the surface formed with the birefringent portion 422 to stick the ultraviolet curing adhesive on the base plate 421.

Subsequently, after separating the both of the plates 421 and 423 to a designed distance, ultraviolet is irradiated on the adhesion surface to cure the adhesive to keep the gap between the plates 421 and 423.

Finally, the silicone adhesive 424 is coated on the periphery of the plates 421 and 423 and the silicone adhesive 424 is cured.

According to the present embodiment, following advantages can be obtained.

Since the base plate 421 is located on the incident side, the polarization axis of the polarization-converted light beam does not revolve on account of influence of thermal distortion of the base plate 421, thereby conducting appropriate polarization conversion. Further, since the silica glass of low linear expansivity is used as the base material, the base plate is not likely to be distorted when the heat absorbed by the birefringent portion 422 works on the base material, so that light transmission failure can be prevented. Further, since the birefringent portion 422 is made of metal, sufficient durability can be secured.

Since the protection plate 423 covering the birefringent portion 422 is provided and the birefringent portion 422 is sealed and enclosed by the silicone adhesive 424 and the protection plate 423, deterioration of the rib 422A can be prevented, thereby further improving the durability of the polarization plate 42. Accordingly, the polarization plate 42 is not deteriorated even when the projector 1 is exposed to high temperature and humidity during transportation or is used under high temperature and humidity.

Since the antireflection film is formed on the light-incident side of the base plate 421 and the light-incident and light-emission sides of the protection plate 423, light utilization ratio can be improved and unnecessary reflection light on the transmission surface can be prevented, thereby enhancing S/N ratio of the signal.

Since the base plate 421 and the protection plate 423 are bonded on the periphery thereof where the birefringent portion 422 is not formed, the space between the ribs 422A can be prevented from being buried in the adhesive. Accordingly, appropriate polarization conversion can be conducted in the space, thereby producing optically excellent polarization plate 42.

Further, since the silicone adhesive 424 of un-reacted oil component restrained type is used, invasion of solvent into the space between the ribs 422A after bonding can be prevented.

Since the protection plate 423 is of approximately the same shape as the base plate 421, the size of the polarization plate can be set minimum required for polarization conversion, thereby reducing the size of the polarization plate 42.

Since the protection plate 423 is located on the light-emission side of the polarizer and the light being polarized by the polarizer passes through the protection plate 423, the polarized light is more greatly influenced by thermal stress as compared to the base plate 421. Accordingly, the thickness d of the protection base 423 set so that the formula (2) is satisfied, thereby minimizing optical distortion of the protection plate caused by thermal stress. Especially, when silica glass or Neoceram is used, the thickness can be thickened to approximately 1 mm, so that the protection plate is not influenced by optical distortion while maintaining sufficient strength. The thickness of the plate of the other material may preferably be set so that the formula (2) is satisfied.

Second Embodiment

Next, second embodiment of the present invention will be described below. Incidentally, in the following description, the same reference numeral will be attached to the same component as described above, thereby omitting description thereof.

The polarization plate 42 according to the first embodiment has the protection plate 423 of approximately the same shape as the base plate 421 and the periphery of the both of the plates 421 and 423 is bonded by the silicone adhesive 424.

Figure 6:
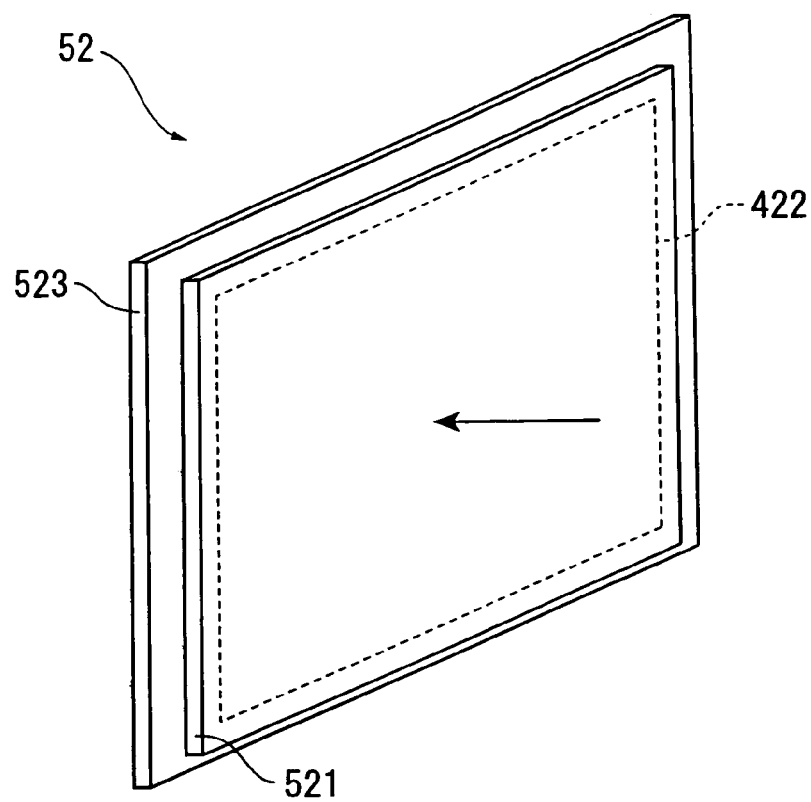
FIG. 6 is a brief perspective view showing a structure of a polarizer according to a second embodiment of the present invention.
Figure 7:
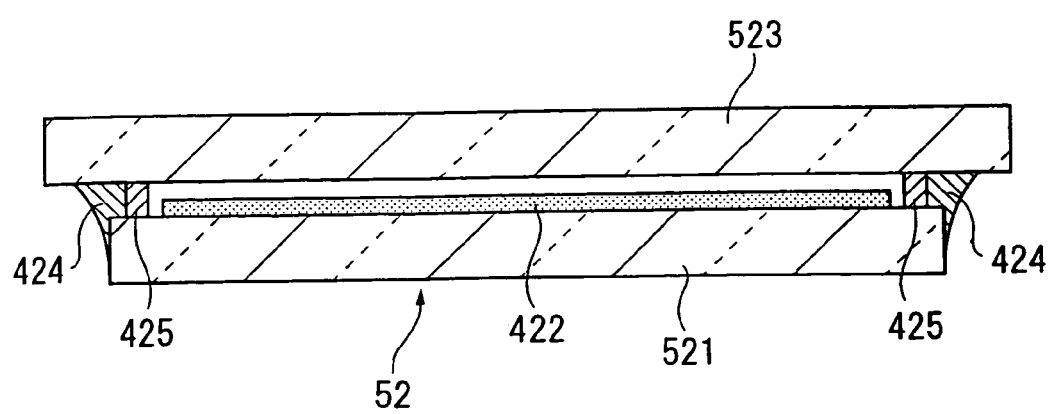
FIG. 7 is a cross section showing a structure of the polarizer according to the second embodiment.

In contrast, a polarization plate 52 according to the second embodiment is different in that a protection plate 523 is greater than a base plate 521 as shown in FIGS. 6 and 7.

The base plate 521 and the protection plate 523 are bonded by the silicone adhesive 424 at the periphery of the base plate 521 and the front surface of the protection plate 523. The amount of the silicone adhesive 424 can be set in any manner by increasing the coating amount on the protection plate 523.

The material of the base plate 421 and the protection plate 423 of the polarization plate 42 of the first embodiment is silica glass.

In contrast, the material of the base plate 521 and the protection plate 523 of the polarization plate 52 according to the second embodiment is sapphire. Incidentally, though not shown, antireflection film is formed on the light-incident side of the base plate 521 and the light-incident and light-emission sides of the protection plate 523, thereby securing light transmittance of more than 97%.

Sapphire has high linear expansivity of $53*10^{-7}$/K and has extremely high thermal conductivity of 42 W/(m·K).

In disposing the polarization plate 52 on the optical path of the projector 1, it is preferable that the polarization plate 52 is attached to the holding frame such as metal plate to form heat radiation path and the heat absorbed by the birefringent portion 422 is radiated from the holding frame through the base plate 521 and the protection plate 523.

According to the second embodiment, following advantages as well as the advantages mentioned in the first embodiment can be obtained.

Since sapphire having high thermal conductivity is used as the material of the base plate 521 and the protection plate 523, even when the heat absorbed by the birefringent portion 422 works on the base plate 521 and the protection plate 523, the heat can be immediately radiated through the holding frame etc., so that thermal distortion is not likely to be generated on the base plate 521 and the protection plate 523 and light transmission failure of the polarization plate 52 can be prevented.

Since the protection plate 523 is greater than the base plate 521, the end surface of the base plate 521 and the front surface of the protection plate 523 can be bonded through the silicone adhesive 424, adhesion area can be increased and tight adhesion of the plates 521 and 523 can be attained. Further, internal sealability can be improved by increasing the amount of the adhesive.

Further, the polarization plate 52 can be positioned with high accuracy using the external shape of the protection plate 523.

Third Embodiment

Next, third embodiment of the present invention will be described below.

Figure 8:
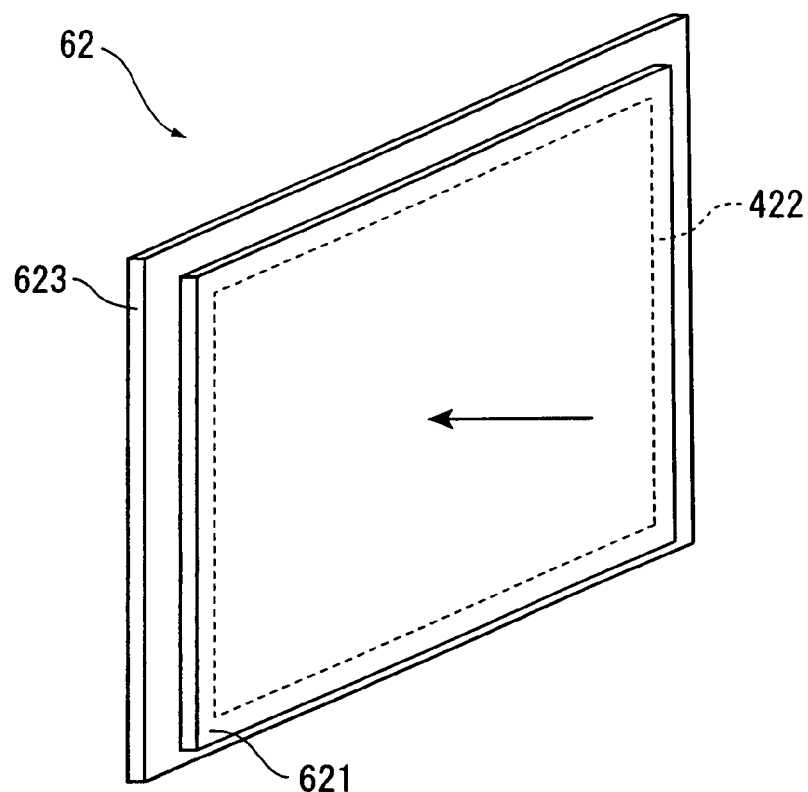
FIG. 8 is a brief perspective view showing a structure of a polarizer according to a third embodiment of the present invention.
Figure 9:
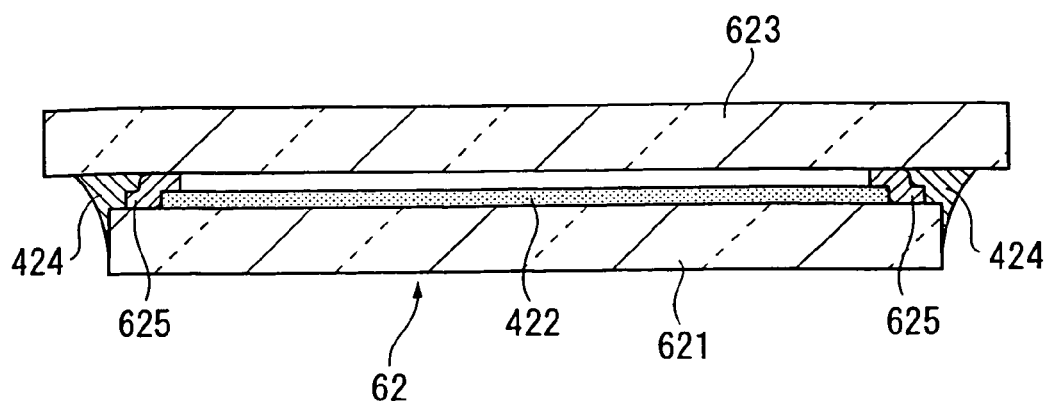
FIG. 9 is a cross section showing a structure of a polarizer according to the third embodiment of the present invention.

As shown in FIGS. 8 and 9, a polarization plate 62 of the third embodiment is similar to the polarization plate 52 of the second embodiment in that the size of protection plate 623 is greater than the size of base plate 621 and the respective plates are made of sapphire. However, the polarization plate 62 is different from the polarization plate 52 in that a spacer 625 interposed between the base plate 621 and the protection plate 623 is double-sided tape.

The spacer 625 is provided along the entire circumference of the birefringent portion 422 and is stuck from the protection plate 623 side of the birefringent portion 422 to the light-emission side of the base plate 621. By disposing the protection plate 623 on the spacer 625, the protection plate 623 and the birefringent portion 422 are spaced apart with a predetermined gap.

Though not shown, a first side abutted to the protection plate 623 and a second side abutted to the base plate 621 of the spacer 625 as the double-sided tape are formed with silicone sticky agent (temporary adhesive) and the first and the second sides (top and bottom sides) are of elastic sticky surface. Further, a support of glass cloth is provided between the first side and the second side. The thickness of the double-sided tape is approximately 0.15 mm, adhesive force is 11.77 N/20 mm and shearing adhesion is 196.1 N/4 cm$^2$.

Incidentally, the arrangement of the double-sided tape is not restricted to the above, but the first and the second sides may be formed of acrylic resin and the support may be made of unwoven fabric. Further, the support may not be provided. Without the provision of the support, the thickness of the spacer can be reduced, so that the thickness of the polarization plate can be reduced. Examples of the double-sided tape capable of being used as the spacer are listed in Table 1.

TABLE 1

| Sticky Agent of First Side Support Sticky Agent of Second Side | Thickness mm | Adhesive Force N/20 mm (gf/20 mm) | Shearing Adhesion N/4 cm$^2$ (kgf/4 cm$^2$) |
|---|---|---|---|
| Acryl Unwoven Fabric Acryl | 0.16 | 19.61 (2000) | 490.3 (50) |
| Silicone Glass Cloth Silicone | 0.15 | 11.77 (1200) | 196.1 (20) |
| Acryl (No Support) | 0.050 | 10.79 (1100) | 255.0 (26) |
| Silicone (No Support) | 0.050 | 10.40 (1060) | — |

Next, producing method of the polarization plate 62 will be described below.

Initially, the double-sided tape is stuck on the periphery of the birefringent portion 422 of the base plate 621. At this time, the end of the double-sided tape is put on the surface of the protection plate 623 of the birefringent portion 422.

Subsequently, the protection plate 623 is stuck on the first side of the double-sided tape.

Further, the end surface of the base plate 621 and the front surface of the protection plate 623 are bonded with the silicone adhesive 424.

According to the third embodiment, following advantages can be obtained as well as the advantages mentioned in the first and the second embodiments.

Since the spacer 625 is double-sided tape, the spacer 625 can be disposed only by sticking the double-sided tape, so that attachment process of the spacer 625 can be facilitated.

Sine the double-sided tape is stuck on the entire periphery of the birefringent portion 422, even when un-reacted oil component is leaked out of the silicone adhesive 424 bonding the protection plate 623 and the base plate 621, the leakage can be stopped by the double-sided tape, thereby preventing the birefringent portion 422 from being contaminated by the un-reacted oil component.

Since the first side and the second side of the spacer 625 is coated with silicone sticky agent and silicone has excellent ultraviolet resistance on the adhesion surface, the spacer 625 can be prevented from deteriorated by ultraviolet.

Further, since silicone has excellent heat resistance, the spacer is not likely to be influenced and deformed by the heat absorbed by the birefringent portion 422.

Since the glass-cloth support is provided between the first side and the second side of the spacer 625 and appropriate rigidity is given to the spacer 625, the attachment process of the spacer 625 is facilitated.

[Modifications]

Incidentally, the scope of the present invention is not restricted to the above-descried respective embodiments, but includes following modifications.

Though the structural birefringent polarization plate 42 as a polarization plate disposed on the incident-side of the liquid crystal panels 41R, 41G and 41B is used in the above-described respective embodiments, structural birefringent polarization plate may be used for the polarization plate 43 on the emission side. In this case, in order to dispose the polarization plate on the light-emission side, the rib 422A constituting the birefringent portion 422 is arranged to a light-absorbing color such as black instead of aluminum reflecting the non-transmitted polarization light beam.

Though silica glass is used as the material of low linear expansivity in the first embodiment, optical glass or crystallized glass may be used. Though sapphire glass is used in the second and the third embodiments, crystal may be used. In short, any low linear expansivity or high thermal conductivity material may be selected in accordance with heating degree of the polarizer. Incidentally, when optical glass is used for the protection glass, the thickness of the protection plate may preferably be about 0.1 mm.

Though the material of the plates 421, 521 and 621 and the protection plates 423, 523 and 623 is selected in view of low linear expansivity and high thermal conductivity, the arrangement of the present invention is not restricted thereto. Specifically, inorganic substance of low photoelasticity constant may be selected as the material of the base plate and the protection plate, where a material of photoelasticity constant below $0.43*10^{-12}$/Pa may preferably be used. Specifically, low photoelasticity glass of LBC3N manufactured by HOYA OPTICS CORPORATION may be used.

With the use of such material of low photoelasticity constant, even when the heat absorbed by the birefringent portion affects on the base plate, the optical-path difference of the transmitted light can be reduced, so that light transmission failure can be prevented.

Though the double-sided tape spacer 625 is used as the polarization plate 62 having the protection plate 623 greater than the base plate 621 in the third embodiment, the spacer 625 may be used in an arrangement where the protection plate 423 and the base plate 421 are of approximately the same size as in the polarization plate 42 of the first embodiment.

Though the present invention is used as the polarization plates 42, 52 and 62 for the liquid crystal panels 41R, 41G and 41B of the projector 1, the arrangement of the present invention is not restricted thereto. Specifically, the polarizer may be used to the other optical device and optical modulators other than the liquid crystal device, so that the same functions and advantages can be obtained as described in the above respective embodiments.

Other specific arrangements and materials may be used in implementing the present invention as long as an object of the present invention can be achieved.

What is claimed is:

1. A polarizer for converting incident light beam into a linear polarization light beam, comprising:
    a base plate of a material having light transmittance of more than 97%, wherein the polarizer is configured to be disposed in a device such that the base plate has a light-emission surface side, and the base plate is made of material having linear expansivity of less than $4.8*10^{-7}$/K; and
    a birefringent portion formed by arranging minute metal raised treads in stripe on the light-emission surface of the base plate.

2. The polarizer according to claim 1,
    wherein the base plate is made of crystallized glass.

3. The polarizer according to claim 2,
wherein the base plate is made of silica glass.

4. The polarizer according to claim 1,
wherein antireflection treatment is conducted on a light-incident surface of the base plate.

5. The polarizer according to claim 1, further comprising a protection plate covering the birefringent portion.

6. The polarizer according to claim 5,
wherein the protection plate is made of a material having light transmittance of more than 97%.

7. The polarizer according to claim 6,
wherein the protection plate is made of a material having linear expansivity of less than $4.8*10^{-7}$/K.

8. The polarizer according to claim 6,
wherein the protection plate is made of a material having thermal conductivity of more than 6.21 W/(m·K).

9. The polarizer according to claim 6,
wherein the protection plate is made of a material having photoelasticity constant of less than $0.43*10^{-12}$/Pa.

10. The polarizer according to claim 5, the polarizer satisfying the formula of:

$$B*E*\alpha/\rho*d \leq 9.8*10^{-5} (m^2/W)$$

where d(mm) represents thickness, B ($10^{-12}$/Pa) represents photoelasticity, E (Pa) represents Young's modulus, $\alpha$ (1/K) represents linear expansivity, and $\rho$ (W/(m·K)) represents thermal conductivity of the protection plate.

11. The polarizer according to claim 5,
wherein antireflection treatment is conducted on light-incident and light-emission surfaces of the protection plate.

12. The polarizer according to claim 5,
wherein the protection plate is bonded to the base plate by an elastic adhesive at the outer periphery thereof, and wherein the birefringent portion is sealed by the protection plate and the elastic adhesive.

13. The polarizer according to claim 12,
wherein the elastic adhesive is a silicone adhesive.

14. The polarizer according to claim 13,
wherein the elastic adhesive is a silicone adhesive of un-reacted oil component restrained type.

15. The polarizer according to claim 5,
wherein the protection plate has approximately the same shape as the base plate.

16. The polarizer according to claim 5,
wherein the protection plate is greater than the base plate.

17. The polarizer according to claim 5,
wherein a spacer is interposed between the base plate and the protection plate.

18. The polarizer according to claim 17,
wherein the spacer is made of light-curing adhesive.

19. The polarizer according to claim 17,
wherein the spacer is a double-sided tape having elastic sticky surface on front and back sides thereof.

20. The polarizer according to claim 19,
wherein the sticky surface of the spacer is formed by silicone sticky agent.

21. The polarizer according to claim 20,
wherein the spacer has a support body made of woven fabric or unwoven fabric, the front and back sides of the support body being provided with a sticky surface coated with the silicone sticky agent.

22. The polarizer according to claim 20,
wherein the spacer is composed of the silicone sticky agent.

23. A projector, comprising:
a light source;
an integrator illuminating optical system including the light source;
an electrooptic device that modulates a light beam from the integrator illuminating optical system in accordance with an image information; and
a projection optical system that enlarges and projects the light beam modulated by the electrooptic device,
the electrooptic device including:
an electrooptic element having an electrooptic material sandwiched between a pair of substrates; and
a polarizer according to claim 1, the polarizer disposed on a light-incident side and/or a light-emission side of the electrooptic element.

24. An optical device comprising an electric optical device for modulating a light beam irradiated by a light source,
the electric optical device having an electric optical element sandwiching an electric optical material between a pair of plates and a polarizer disposed on a light-incident side and/or a light-emission side of the electric optical device,
the polarizer having a base plate made of a material having light transmittance of more than 97%, the base plate having a light-incident side and a light-emission side, and a birefringent portion formed by arranging minute metal raised rectangular treads in stripe, the bireflingent portion being formed only on the light-emission side of the base plate; and
wherein the base plate is made of material having linear expansivity of less than $4.8*10^{-7}$/K.

25. The optical device according to claim 24,
wherein the base plate is made of crystallized glass.

26. The optical device according to claim 25,
wherein the base plate is made of silica glass.

27. The optical device according to claim 24,
wherein antireflection treatment is conducted on a light-incident surface of the base plate.

28. The optical device according to claim 24, further comprising a protection plate covering the birefringent portion.

29. The optical device according to claim 28,
wherein the protection plate is made of a material having light transmittance of more than 97%.

30. The optical device according to claim 29,
wherein the protection plate is made of a material having linear expansivity of less than $4.8*10^{-7}$/K.

31. The optical device according to claim 29,
wherein the protection plate is made of a material having thermal conductivity of more than 6.21 W/(m·K).

32. The optical device according to claim 29,
wherein the protection plate is made of a material having photoelasticity constant of less than $0.43*10^{-12}$/Pa.

33. The optical device according to claim 28, the polarizer satisfying the formula of:

$$B*E*\alpha/\rho*d \leq 9.8*10^{-5} (m^2/W)$$

where d(mm) represents thickness, B ($10^{-12}$/Pa) represents photoelasticity, E (Pa) represents Young's modulus, $\alpha$ (1/K) represents linear expansivity, and $\rho$ (W/(m·K)) represents thermal conductivity of the protection plate.

34. The optical device according to claim 28,
wherein antireflection treatment is conducted on light-incident and light-emission surfaces of the protection plate.

35. The optical device according to claim 28,
wherein the protection plate is bonded to the base plate by an elastic adhesive at the outer periphery thereof, and wherein the birefringent portion is sealed by the protection plate and the elastic adhesive.

36. The optical device according to claim 35,
wherein the elastic adhesive is a silicone adhesive.

37. The optical device according to claim 36,
wherein the elastic adhesive is a silicone adhesive of un-reacted oil component restrained type.

38. The optical device according to claim 28,
wherein the protection plate has approximately the same shape as the base plate.

39. The optical device according to claim 28,
wherein the protection plate is greater than the base plate.

40. The optical device according to claim 28,
wherein a spacer is interposed between the base plate and the protection plate.

41. The optical device according to claim 40,
wherein the spacer is made of light-curing adhesive.

42. The optical device according to claim 40,
wherein the spacer is a double-sided tape having elastic sticky surface on front and back sides thereof.

43. The optical device according to claim 42,
wherein the sticky surface of the spacer is formed by silicone sticky agent.

44. The optical device according to claim 43,
wherein the spacer has a support body made of woven fabric or unwoven fabric, the front and back sides of the support body being provided with a sticky surface coated with the silicone sticky agent.

45. The optical device according to claim 43,
wherein the spacer is composed of the silicone sticky agent.

46. The optical device according to claim 24, wherein the optical device is a projector.

47. An optical device comprising an electric optical device for modulating a light beam irradiated by a light source,
the electric optical device having an electric optical element sandwiching an electric optical material between a pair of plates and a polarizer disposed on a light-incident side and/or a light-emission side of the electric optical device,
the polarizer having a base plate made of a material having light transmittance of more than 97%, the base plate having a light-incident side and a light-emission side, and a birefringent portion formed by arranging minute metal raised rectangular treads in stripe, the birefringent portion being formed only on the light-emission side of the base plate; and
wherein the base plate is made of a material having thermal conductivity of more than 6.21 W/(m·K).

48. The optical device according to claim 47,
wherein the base plate is made of sapphire.

49. The optical device according to claim 47,
herein the base plate is made of crystal.

50. The optical device according to claim 47,
wherein antireflection treatment is conducted on a light-incident surface of the base plate.

51. The optical device according to claim 47, further comprising a protection plate covering the birefringent portion.

52. The optical device according to claim 51,
wherein the protection plate is made of a material having light transmittance of more than 97%.

53. The optical device according to claim 52,
wherein the protection plate is made of a material having linear expansivity of less than $4.8*10^{-7}$/K.

54. The optical device according to claim 52,
wherein the protection plate is made of a material having thermal conductivity of more than 6.21 W/(m·K).

55. The optical device according to claim 52,
wherein the protection plate is made of a material having photoelasticity constant of less than $0.43*10^{-12}$/Pa.

56. The optical device according to claim 51, the polarizer satisfying the formula of:

$$B*E*\alpha/\rho*d \leq 9.8*10^{-5} (m^2/W)$$

where d(mm) represents thickness, B ($10^{-12}$/Pa) represents photoelasticity, E (Pa) represents Young's modulus, $\alpha$ (1/K) represents linear expansivity, and $\rho$ (W/(m·K)) represents thermal conductivity of the protection plate.

57. The optical device according to claim 51,
wherein antireflection treatment is conducted on light-incident and light-emission surfaces of the protection plate.

58. The optical device according to claim 51,
wherein the protection plate is bonded to the base plate by an elastic adhesive at the outer periphery thereof, and wherein the birefringent portion is sealed by the protection plate and the elastic adhesive.

59. The optical device according to claim 58,
wherein the elastic adhesive is a silicone adhesive.

60. The optical device according to claim 59,
wherein the elastic adhesive is a silicone adhesive of un-reacted oil component restrained type.

61. The optical device according to claim 51,
wherein the protection plate has approximately the same shape as the base plate.

62. The optical device according to claim 51,
wherein the protection plate is greater than the base plate.

63. The optical device according to claim 51,
wherein a spacer is interposed between the base plate and the protection plate.

64. The optical device according to claim 63,
wherein the spacer is made of light-curing adhesive.

65. The optical device according to claim 63,
wherein the spacer is a double-sided tape having elastic sticky surface on front and back sides thereof.

66. The optical device according to claim 65,
wherein the sticky surface of the spacer is formed by silicone sticky agent.

67. The optical device according to claim 66,
wherein the spacer has a support body made of woven fabric or unwoven fabric, the front and back sides of the support body being provided with a sticky surface coated with the silicone sticky agent.

68. The optical device according to claim 66,
wherein the spacer is composed of the silicone sticky agent.

69. The optical device according to claim 47, wherein the optical device is a projector.

70. An optical device comprising an electric optical device for modulating a light beam irradiated by a light source,
the electric optical device having an electric optical element sandwiching an electric optical material between a pair of plates and a polarizer disposed on a light-incident side and/or a light-emission side of the electric optical device, the polarizer having a base plate made of a material having light transmittance of more than 97%, the base plate having a light-incident side and a light-emission side, and a birefringent portion formed by arranging minute metal raised rectangular treads in stripe, the birefringent portion being formed only on the light-emission side of the base plate; and wherein the base plate is made of a material having photoelasticity constant of less than $0.43*10^{-12}$/Pa.

71. The optical device according to claim 70, wherein antireflection treatment is conducted on a light-incident surface of the base plate.

72. The optical device according to claim 70, further comprising a protection plate covering the birefringent portion.

73. The optical device according to claim 72, wherein the protection plate is made of a material having light transmittance of more than 97%.

74. The optical device according to claim 73, wherein the protection plate is made of a material having linear expansivity of less than $4.8*10^{-7}$/K.

75. The optical device according to claim 73, wherein the protection plate is made of a material having thermal conductivity of more than 6.21 W/(m·K).

76. The optical device according to claim 73, wherein the protection plate is made of a material having photoelasticity constant of less than $0.43*10^{-12}$/Pa.

77. The optical device according to claim 72, the polarizer satisfying the formula of:

$$B*E*\alpha/\rho*d \leq 9.8*10^{-5} (m^2/W)$$

where d(mm) represents thickness, B ($10^{-12}$/Pa) represents photoelasticity, E (Pa) represents Young's modulus, $\alpha$ (1/K) represents linear expansivity, and $\rho$ (W/(mK)) represents thermal conductivity of the protection plate.

78. The optical device according to claim 72, wherein antireflection treatment is conducted on light-incident and light-emission surfaces of the protection plate.

79. The optical device according to claim 72, wherein the protection plate is bonded to the base plate by an elastic adhesive at the outer periphery thereof, and wherein the birefringent portion is sealed by the protection plate and the elastic adhesive.

80. The optical device according to claim 79, wherein the elastic adhesive is a silicone adhesive.

81. The optical device according to claim 80, wherein the elastic adhesive is a silicone adhesive of un-reacted oil component restrained type.

82. The optical device according to claim 72, wherein the protection plate has approximately the same shape as the base plate.

83. The optical device according to claim 72, wherein the protection plate is greater than the base plate.

84. The optical device according to claim 72, wherein a spacer is interposed between the base plate and the protection plate.

85. The optical device according to claim 84, wherein the spacer is made of light-curing adhesive.

86. The optical device according to claim 84, wherein the spacer is a double-sided tape having elastic sticky surface on front and back sides thereof.

87. The optical device according to claim 86, wherein the sticky surface of the spacer is formed by silicone sticky agent.

88. The optical device according to claim 87, wherein the spacer has a support body made of woven fabric or unwoven fabric, the front and back sides of the support body being provided with a sticky surface coated with the silicone sticky agent.

89. The optical device according to claim 87, wherein the spacer is composed of the silicone sticky agent.

90. The optical device according to claim 70, wherein the optical device is a projector.

* * * * *